United States Patent [19]

Gambini et al.

[11] 4,223,221
[45] Sep. 16, 1980

[54] SCINTILLATION CAMERA UNIFORMITY CORRECTION

[75] Inventors: Michael R. Gambini, Wallingford, Conn.; Gary Benenson, Brooklyn, N.Y.

[73] Assignee: Picker Corporation, Cleveland, Ohio

[21] Appl. No.: 917,070

[22] Filed: Jun. 19, 1978

[51] Int. Cl.² .................. G01T 1/20; G01T 1/208
[52] U.S. Cl. .................. 250/363 S; 250/369
[58] Field of Search .......... 250/252, 363 S, 369, 250/361 R, 445 T

[56] References Cited

U.S. PATENT DOCUMENTS

| | | | |
|---|---|---|---|
| 3,878,373 | 4/1975 | Blum | 250/252 |
| 4,095,108 | 6/1978 | Inbar et al. | 250/369 |
| 4,115,694 | 9/1978 | Lange et al. | 250/369 |
| 4,151,416 | 4/1979 | Richey et al. | |

FOREIGN PATENT DOCUMENTS 2719837 12/1977 Fed. Rep. of Germany.

OTHER PUBLICATIONS

"Correction Automatique de la defendance en position de l'energie" (compte rendu 11ᵉ Collogue International, sur la fixation renale du Hg radioactif, Paris, 24–25, Oct. 1975).

*Primary Examiner*—Alfred E. Smith
*Assistant Examiner*—Janice A. Howell
*Attorney, Agent, or Firm*—Watts, Hoffmann, Fisher & Heinke Co.

[57] ABSTRACT

A two-stage system for enhancing the imaging uniformity of a scintillation camera is disclosed. The camera includes means for detecting radiation events and for producing radiation count signals indicating the location and energy level of individual detected radiation events. The uniformity correction system compensates for imprecision in the camera's indication of both radiation event regional image count density and event energy level. Compensation for energy indication errors is done by a first stage, prior to a second stage correction for residual nonuniformity in regional image count density. The operations of both stages are carried out in real time for each individual radiation count, independently of the production of other counts.

The first stage location and stores a representation of the respective peaks of the detected energy pulse height distribution for each of a plurality of regions in the camera's field of view. This regional profile of the camera's energy response characteristic is used to successively realign for each count the pulse height energy window defined by the camera imaging circuitry, to align the window over the respective energy peak for each count as a function of the count's location indication.

The second uniformity correction stage, a flood correction circuit, produces and stores a profile of regional variation in the image count density indicated by the camera in response to a uniform radiation flood over its field. This stored information is used for calculating regional count density correction factors for different regions of the camera field. The correction factors are used for controlling the ratio of radiation counts corresponding to each region which are actually imaged, thus eliminating residual nonuniformity caused by nonuniform regional image count density produced by the camera.

No scintillation camera is capable of producing radiation count signals which define either the location or the energy level of radiation events with absolute precision. Minute inaccuracies in the location, and energy level decoding cause nonuniformity in the image count density of the scintillation camera systems.

The uniformity of image count density of a scintillation camera detector can be degraded by factors including inaccuracies in energy level decoding, inaccuracies in location (x–y) decoding, nonlinearity), regional variations in detector sensitivity, and other factors.

23 Claims, 9 Drawing Figures

SCINTILLATION CAMERA UNIFORMITY CORRECTION

BACKGROUND OF THE INVENTION

1. Field of the Invention

This invention relates to the field of nuclear scintillation cameras, and more particularly to systems and methods for improving uniformity of imaging response of such cameras.

Radiation scintillation cameras are useful in medical diagnostics. Such cameras detect the presence and distribution of radio-active tracers which are injected into patients and which have characteristic affinity, depending on the kind of tracer used, for certain organs and tissue types. By detecting the tracer and producing an image of the radiation pattern generated by the tracer within the selected organ or tissue, an image describing characteristics or condition of the organ or tissue is produced.

Commonly used scintillation cameras include a unit for detecting radiation events from within the patient, stimulated by the radio-active tracer, and downstream imaging electronics and display apparatus coupled to the detector for producing a visual image of the pattern of the radio-active tracer within the patient's body.

The detector includes a scintillation crystal, which is responsive to radiation events impinging upon it to produce a light flash, or scintillation, within the crystal in the vicinity of where the radiation strikes it. An array of photomultiplier tubes is disposed to view the crystal. The photomultiplier tubes convert the light flash of each scintillation event to an electrical signals. A decoding matrix is connected to the phototube array and converts each set of electrical signals from the photomultiplier tubes to a radiation count signal indicating both the location (on an x—y plane) and energy level (brightness) of the scintillation event in response to which the radiation count signal is produced.

No scintillation camera is capable of producing radiation count signals which define either the location or the energy level of radiation events with absolute precision. Minute inaccuracies in the location, and energy level decoding cause nonuniformity in the image count density of the scintillation camera systems.

The uniformity of image count density of a scintillation camera detector can be degraded by factors including inaccuracies in energy level decoding, inaccuracies in location (x-y) decoding, (nonlinearity), regional variations in detector sensitivity, and other factors.

Incorrect energy level decoding is caused in part by the fact that the sensitivity of photomultiplier tubes to a scintillation depends upon the angular orientation of the scintillation relative to the tube axis. Accordingly, even if the photomultiplier tubes are perfectly tuned, it is possible to perfectly adjust them for proper decoding only at a finite number of discreet field locations corresponding to the number of photomultiplier tubes used in the camera system. A large proportion of the detector field is thus non-adjustable, and subject to the degree of non-uniformity of response of each individual photomultiplier tube and the response of each region of the scintillation crystal (which may also have nonuniform response to radiation as a function of location).

Tubes and crystals can thus be highly non-uniform in their response to even a uniform flux of gamma rays input to the crystal.

Incorrect energy level decoding can be exaggerated by electrical drift in the gain of individual photomultiplier tubes which can occur with time.

In addition to adversely affecting energy level decoding uniformity in a general fashion, errors in the energy decoding also render extremely critical the adjustment of pulse height analyzer windows used in the camera, since any degree of error in the adjustment of a window accentuates the incorrect energy level decoding.

Incorrect location decoding (non-linearity) also contributes to deterioration of imaging uniformity. Incorrect location decoding is caused by all of the factors which can contribute to incorrect energy level decoding. When this happens, more or less radiation counts are placed per unit area in different regions of the field, even in response to uniform radiation. The image count density is thus made nonuniform. These regional linearity perturbations need only be tiny to cause large changes in imaging uniformity, because their effect upon image count density is squared. This fact stems from the fact that the linearity perturbations are usually superimposed, because the same tubes and crystal are used to decode both the "x" and "y" location co-ordinates.

Various other factors adversely affect uniformity. A partial enumeration of these are collimator regional sensitivity changes, regional variations in crystal light conversion efficiency changes, and gamma detection efficiency, and electronically caused non-linearity and regional sensitivity variations.

2. Description of the Prior Art

Proposals have been made to compensate or correct for non-uniformity in scintillation camera imaging. One such proposal involves the digitization and recording of information produced by a scintillation camera and describing radiation images. The information for an entire study is digitized and recorded on magnetic tape. After completion of the study, the stored information is input to a digital computer which analyzes and manipulates the information in accordance with certain algorithms. The algorithms are chosen such that the processed information is corrected for imaging uniformity. The processed information is then reconverted to analogue form by display apparatus, and images corresponding to radiation detected in the earlier study can be observed.

Operation in accordance with this proposal is slow, and requires highly expensive, complex and bulky equipment, including a digital computer.

The results of uniformity corrected studies cannot be viewed directly. Rather, such results are available only after recording, processing and reconversion of the imaging information to analogue form. The requirement for complex digital computing equipment and its programming is highly expensive and requires skilled setup and operation personnel.

Another proposal for uniformity correction has been made which does not require the use of complex digital computational equipment. In this more recent proposal, only regional image count density errors are corrected. In such a proposal, the camera is preconditioned by exposure to a uniform gamma radiation flux over its field of view prior to the initiation of a study. The response of the camera to this uniform radiation is measured over several different regions of the field, and the measured response for each region is stored. This stored sensitivity information is used to cause the camera to discard some of the counts from high sensitivity regions, to equalize the response of the camera in its high sensitivity regions with the response in regions of lower sensitivity.

This proposal for uniformity correction has at least two disadvantages. One disadvantage is that it corrects, as mentioned above, only for imprecisions in regional image sensitivity, and fails to correct for energy level inaccuracies. A second disadvantage, perhaps more important, is that, by discarding a substantial number of radiation counts, this uniformity correction proposal reduces camera sensitivity considerably. The reduction in sensitivity lengthens the time required for performing diagnostic studies with the camera, and impairs resolution of radiation images produced by the camera, which obviously impairs the camera's effectiveness.

SUMMARY OF THE INVENTION

This invention obviates the disadvantages of the prior art by providing a two-stage real time uniformity enhancement system for a scintillation camera having detection and decoding means for producing radiation count signals representing the location and energy level of radiation events in a subject. The systems includes a first sensitivity and uniformity enhancement stage which includes circuitry for compensating in real time for radiation energy decoding errors manifested in the energy level representation of each radiation count produced by the camera. The first stage also enhances effective energy resolution and thus enhances spatial resolution in compton scatter media, such as clinical images. The system also includes a second stage comprising circuitry for compensating for regional image sensitivity errors due to other causes manifested in the radiation count signals.

This dual stage uniformity enhancement system improves the degree of uniformity enhancement by compensating for errors in the energy level decoding, as well as for errors in regional image sensitivity due to other causes. Moreover, the first stage, which compensates for energy level decoding inaccuracies, has an additional effect of enhancing the sensitivity of the camera, a feature which compensates for tendencies in the second correction stage to reduce camera sensitivity. Thus, not only does the first stage add an aspect of uniformity correction not previously obtained in real time systems, but it also, for the first time, makes it possible to correct for regional image sensitivity errors without the previous sacrifice in sensitivity of the scintillation camera.

In accordance with a more specific aspect of the invention, the first stage, for energy level decoding compensation, comprises means for measuring and locating the peak of the pulse-height distribution for each of a plurality of camera field regions. The first stage also includes circuitry, such as a pulse-height analyzer with an adjustable window, for defining a pulse-height distribution window of the camera for controlling the energy range of counts accepted for processing by the camera. The first stage further includes circuitry for calculating correction factors for each of the field regions for successively aligning the pulse-height window defined by the pulse-height analyzer with the peaks of the pulse-height distributions of a succession of regions each corresponding to a succession of respective radiation counts produced by the camera.

Thus, the first stage operates in synchronism with the production of a series of radiation counts to effectively center the pulse-height window of the processing and display circuitry of the camera so that the pulse-height window is located for each pulse in an optimum position to receive energy from the field region in which the particular count being processed is located. Each time a count occurs, the first stage responds to the count by automatically relocating the pulse-height analyzer window such that it is most advantageously positioned to receive all the energy from the particular field region in which that count originates.

According to another specific aspect of the invention, the second stage comprises a multichannel flood correction memory for defining an indication of camera sensitivity in each channel, each channel defining the camera sensitivity in a different predetermined camera field region. The indication of camera sensitivity in each channel is corrected for errors in energy level decoding through utilization of the first stage correction circuitry. The second stage also includes flood processor circuitry for utilizing the regional sensitivity information stored in the flood correction memory for calculating a sensitivity correction factor associated with each of the defined regions. The flood processor circuitry also includes means for utilizing the correction factor for each region for regionally adjusting the camera's degree of respnse to radiation counts as a function of the co-ordinate locations of those counts.

More specifically, the flood processor circuitry includes circuitry for accumulating in the flood correction memory the numbers of counts occurring in the various respective regions during a predetermined time, and means for locating the region indicating channel of the flood direction memory having the lowest accumulated count. The flood correction processor circuitry also includes circuitry for calculating the correction factors for other regions relative to that lowest count.

Even more specifically, the flood processor circuitry includes a continuously operable counter, along with comparison circuitry which is responsive to the counter and to the various calculated correction factors for the respective regions to discard a predetermined ratio of counts corresponding to each respective region as a function of the correction factor for that region.

In accordance with a more specific aspect of the invention, the first stage, or energy level compensation stage, comprises a multi-channel window correction memory for storing a profile of information describing the energy distribution response characteristics of the radiation camera in each of a plurality of regions within its field. The first stage also includes energy window processor circuitry for utilizing the energy distribution response information stored in the window correction memory for adjusting the pulse-height analyzer for each of a succession of radiation counts to substantially align the energy range to which the camera is responsive with the energy distribution characteristic of the region corresponding to each respective radiation count as those counts are produced.

In accordance with a still more specific aspect of the first stage, the uniformity enhancement system further comprises circuitry for initializing each channel of the window correction memory to a predetermined value preparatory to doing a study. The system also includes two counters, a first for counting radiation counts whose energy is above the particular value stored in the multi-channel memory, and the second for counting those counts whose energy level is below the stored value for the region. The system further comprises circuitry means for comparing the energy levels of each incoming radiation count with the energy window dimensions and for operating in conjunction with the two counters for adjusting the energy level value stored in the particular channel of the window correction memory as a function of the predominant energy level of the counts which are sensed from the particular region.

This invention will be better understood by reference to the following detailed description, and to the drawings, in which:

DESCRIPTION OF THE PREFERRED EMBODIMENT

Figure 1:
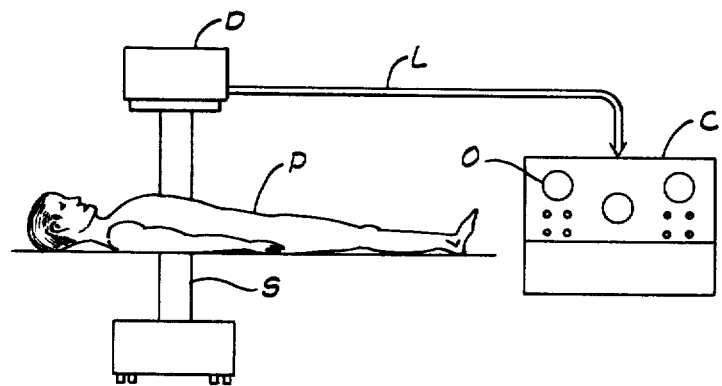
FIG. 1 is a graphical illustration showing a scintillation camera system incorporating the system of this invention.

FIG. 1 graphically shows a radiation scintillation camera suitable for use with the uniformity correction system of this invention. The camera includes a detector unit D mounted on a stand S for examining a patient P. The detector unit D, in response to radiation emanating from radioactive tracer material within the patient's body, produces radiation count signals, each of which describes the location and enegy level of a radiation event within the patient P. These radiation count signals are transmitted over a set of leads L to an operation console C of the camera system. The operation console C includes imaging electronic circuitry for processing the radiation count signals and for utilizing the processed radiation count signals to actuate display apparatus also within the console C for producing visual representations of patterns of radiation emanating from within the body of the patient P. The images are produced by suitable display equipment, such as a cathode ray ascilloscope whose output face is designated O.

Figure 2:
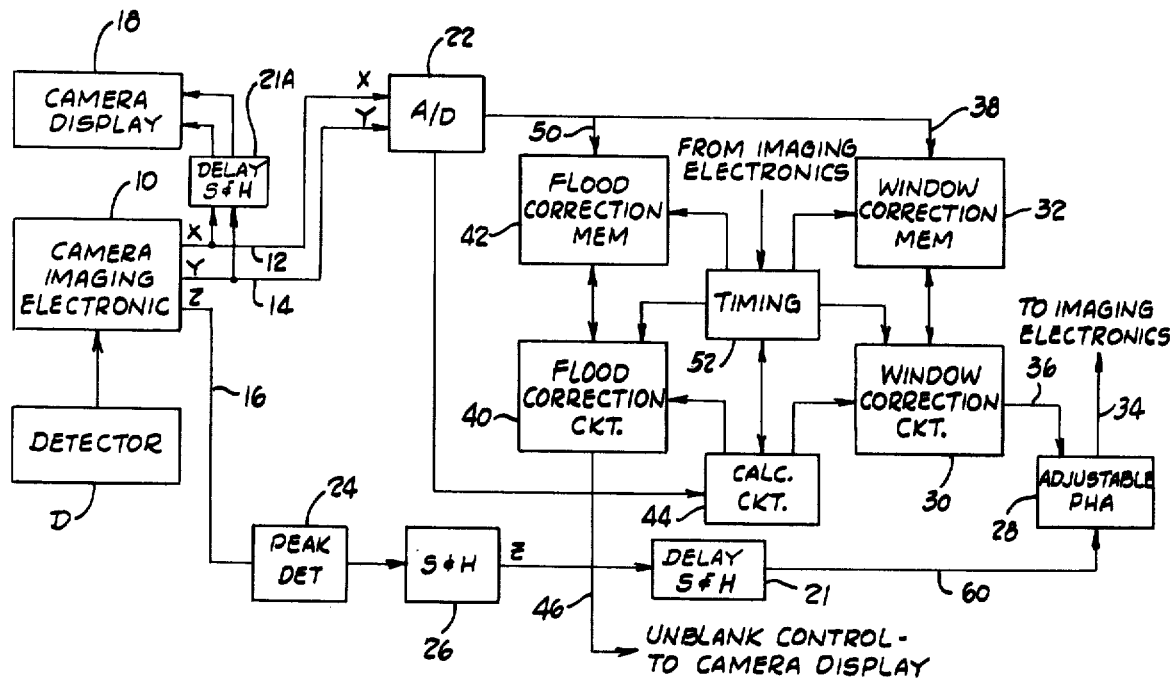
FIG. 2 is a block diagram illustrating the system of this invention incorporated in the system shown in FIG. 1.

The imaging electronics within the console C include a uniformity correction system U, illustrated in block form in FIG. 2. The uniformity correction system U cooperates with the camera to compensate for errors in the radiation count signals which can affect adversely the uniformity of the images produced on the ascilloscope face O.

A suitable radiation scintillation camera into which the uniformity correction system U can be incorporated is a radiation scintillation camera known as "Dyna Camera 4", manufactured by PICKER CORPORATION, Northford, Connecticut, U.S.A.

The uniformity correction system U is a two-stage real time system. A first stage of the system U corrects for errors in the indication of event energy level, which indication is a part of each of the radiation counts produced by the detector D. A second stage compensates for regional image count density errors of the camera, caused by such factors as errors in the location information borne by each radiation count signal, and by nonuniform regional detector sensitivity over its field. Both stages operate in real time. That is, they process and correct for radiation count signal errors on a count by count basis substantially as they are produced, independently of the production of other radiation counts.

FIG. 2 shows in block form the uniformity correction system U and its inter-facing with the radiation scintillation camera. More specifically, the detector D produces radiation count signals which are directed to the camera imaging electronics indicated by the reference character 10. The camera imaging electronics transmits radiation count signals over a set of leads 12, 14, 16. The leads 12, 14 carry the location information for each count, i.e., its co-ordinate location on an x–y plane. The lead 16 carries the component of the radiation count signal which indicates the energy level of the radiation event in response to which the count is produced (called "Z" signal).

The signals on the leads 12, 14 are transmitted to delay sample and hold circuitry 21A, and subsequently to camera display circuitry 18, which produces a visual representation of the location of the radiation events in response to which the radiation count signals are produced.

The location information appearing at the leads 12, 14 are transmitted to sample and hold circuitry 20, and to an analogue to digital converter 22, which converts these signals for processing by the uniformity correction system U.

The intensity level signal is applied over the lead 16 to a known type of peak detection circuit 24 and subsequently to sample and hold circuitry 26, from which it is subsequently applied to the uniformity correction system U.

The system U has four general operative modes. In a first, or "initialization" mode, the circuitry of the system U is prepared for operation. In a second, or "accumulation" mode, the system U receives data from the radiation scintillation camera during a preconditioning operation. In a third or "calcination" mode, the data received during the accumulation mode of operation is processed to provide additional data utilized for accomplishing the correction of radiation count errors during an actual study. Finally, in an "on-line" mode, the radiation camera is operated to execute the study, and radiation counts produced by the camera during the study are manipulated to compensate for errors in the location and intensity level indications of those radiation counts.

The first, or energy level compensation, stage of the system U includes a pulse-height analyzer circuit 28, a window correction processing circuit 30, and a window correction memory 32. The pulse-height analyzer circuit 28 defines an energy window describing a range of energy level. If a "Z" signal component of a radiation count indicates an energy level outside the defined energy range, the pulse-height analyzer will not transmit the "Z" signal, and that count will not be processed by the camera display. Conversely, if the indicated energy level lies within the range established by the pulse-height analyzer, the count will be processed for displaying.

Counts which are transmitted by the pulse-height analyzer 28 are directed to the camera imaging electronics over a lead indicated as 34.

The energy range defined by the pulse-height analyzer 28 is adjustable. The location of the energy window is controlled by an analoque voltage signal on a lead 36 from the window correction processor circuitry 30.

The window correction circuitry 30 performs two functions. During the calculation mode, it receives information from the pulse-height analyzer relating to the energy level indications of the succession of "Z" signals (relative to the defined energy window) applied to the pulse-height analyzer 28, and utilizes that information to calculate regional correction factors which are stored in the window memory 32 and later applied to the pulse-height analyzer 28 during the on-line operation mode to adjust the pulse-height analyzer's defined energy window as a function of the location information borne by each respective radiation count signal during the study, in a manner described in more detail below.

The window correction memory 32 is a multi-channel memory which stores in each channel a correction factor associated with a particular camera field region. These correction factors are calculated by the window correction processing circuitry 30 in response to the information received from the pulse height analyzer 28.

The window correction memory 32 is addressed by the location information of each radiation count, over a lead 38. When a particular count address arrives over the lead 38, the window correction memory 32 makes the contents of that memory channel which corresponds to the field region in which the count took place available to the window correction processor circuitry 30, so that the correction factor may be applied to the pulse-height analyzer 28 during the on-line mode. During the accumulation mode, earlier, the window correction circuitry 30, in cooperation with the "Z" signals received by the pulse-height analyzer 28, progressively updates correction factor information stored in the window correction memory 32 such that each correction factor indicates the value of the center of the statistical pulse-height energy distribution curve defined by all the counts occurring in the accumulation mode time in the field region corresponding to the address channel of the correction factor.

The second stage of the uniformity correction system U includes flood correction processor circuitry 40, a flood correction memory 42 and calculation circuitry 44. The second stage develops a set of correction factors which indicate the regional sensitivity of the camera to uniform radiation across its field. This information is utilized to control the ratio of counts within each region which are displayed, in order to effectively equalize the sensitivity of the camera in each region. For example, if a particular region is one of higher sensitivity, an appropriate fraction of the counts from that region are discarded, such that, for uniform radiation, the high sensitivity region provides the same rate of counts for processing as do lower sensitivity regions, notwithstanding that the higher sensitivity region has actually detected more counts than the lower sensitivity regions.

The flood correction processor circuitry 40 takes sensitivity correction factors stored in the flood correction memory 42 and uses them to correct the uniformity of counts sensitivity in real time. It does this by sending appropriate unblanking signals over a lead 46 to the radiation camera display apparatus. The signals produced on the lead 46 are used to blank out appropriate fractions of radiation counts from higher sensitivity regions, to equalize their impact with that of lower sensitivity regions.

The flood correction memory 42 is a multi-channel memory, each channel of which corresponds to a different predetermined region of the camera field of view. During the accumulation phase, the flood correction memory 42 counts the number of radiation counts signals occurring in each of the defined field regions, developing a regional profile indicating the sensitivity of the camera to uniform radiation which is applied to the camera field of view during the accumulation phase.

During the calculation mode, following the accumulation mode, the sensitivity profile stored in the memory 42 is transmitted by way of the processor circuitry 40 to the calculation circuitry 44. The calculation circuitry 44 computes an appropriate sensitivity correction factor which is stored by the processor circuitry 40 in the memory 42 for use during the on-line phase. During the on-line phase, the flood processing circuitry 40 applies the correction factor for each radiation count signal to determine whether that signal should be blanked out, or whether it should be passed to the camera display apparatus.

During the on-line mode, while an actual study is being performed, each radiation count signal addresses the flood correction memory 42 over a lead 50. The location information presented to the memory 42 over the lead 50 causes the memory to make available to the flood correction processor circuitry 40 the contents of the memory channel corresponding to the region indicated by the radiation count signal.

In addition to calculating correction factors, the calculation circuitry 44 provides initialization for the system U during the initialization mode. For example, during the initialization mode, the calculation circuitry 44 initializes the channels of the flood correction memory 42 to 0, to prepare them for the counting which takes place in the accumulation mode. The calculation circuitry 44 also initializes each channel of the window correction memory 32 to a predetermined nonzero level. This predetermined level is chosen as a reasonable starting point from which to update the regional pulse-height distribution center information for each camera field region during the subsequent accumulation mode.

Timing circuitry 52, comprising known components, can be provided by one of ordinary skill to control the sequence of operations of the various components of the system U.

The sample and hold circuitry 21 and 21A comprises standard sample and hold modules used for delaying the X, Y and Z signals while processing unblanking signals.

Specifics of the system U are embodied suitably by apparatus designed for incorporation into the above referenced "Dyna Camera 4", known as "Micro Z", manufactured by PICKER CORPORATION, Northford, Conn., U.S.A.

The sample and hold circuitry 26 comprises derandomizer circuitry having cascaded buffers exemplified in U.S. Pat. No. 4,024,398 issued on May 17, 1977 to Kenneth F. Hatch, which patent is expressly incorporated by reference here.

The analogue to digital converter 22 consists of two parallel channels for the "X" and "Y" co-ordinate signals. Each channel consists of a line receiver, a sample and hold module, a twelve-bit successive approximation analogue to digital converter and an eight-bit latch. The output utilizes only six bits of "X" and "Y" address information, respectively, on each channel.

Figure 7:
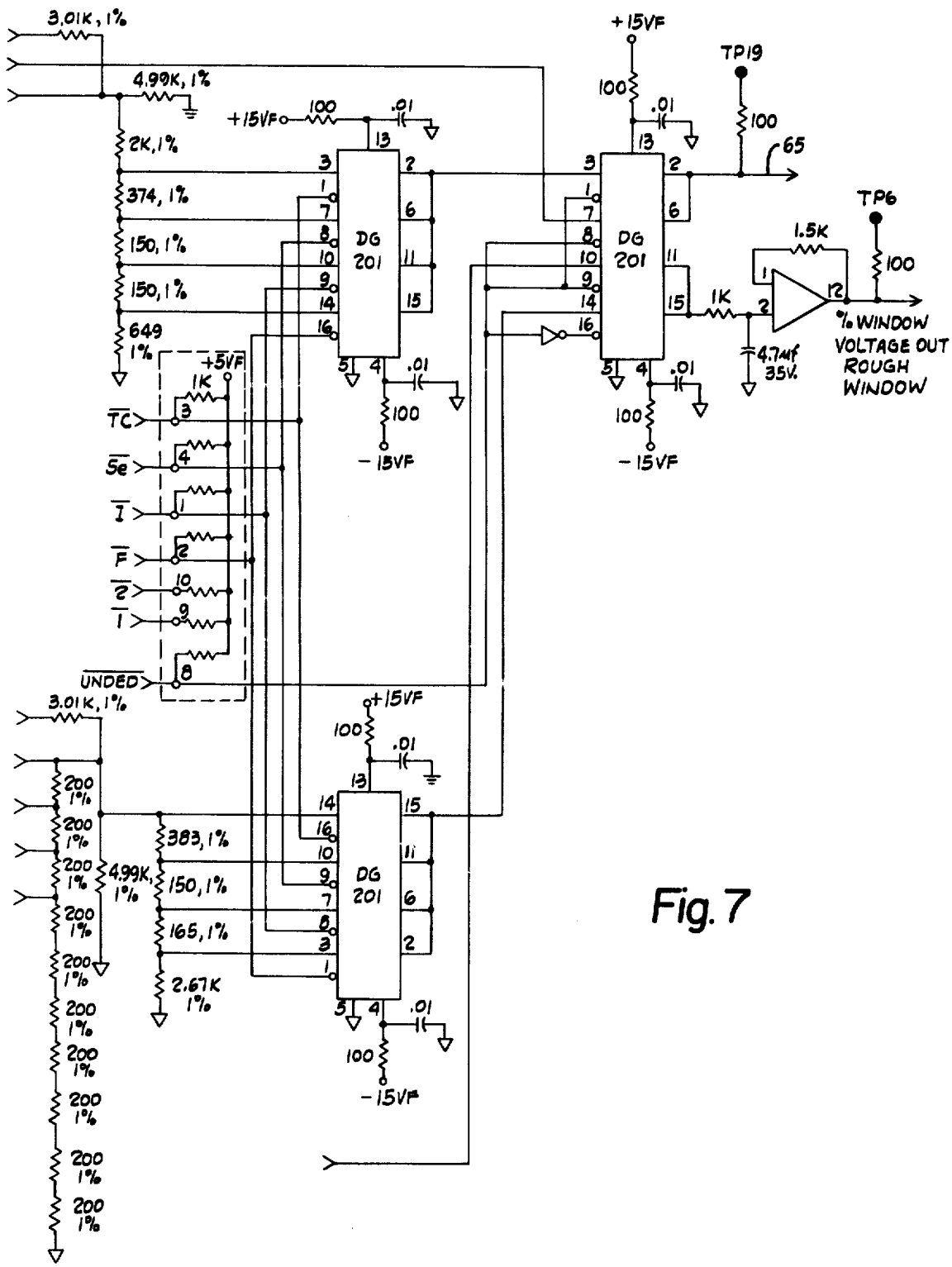
Figure 8:
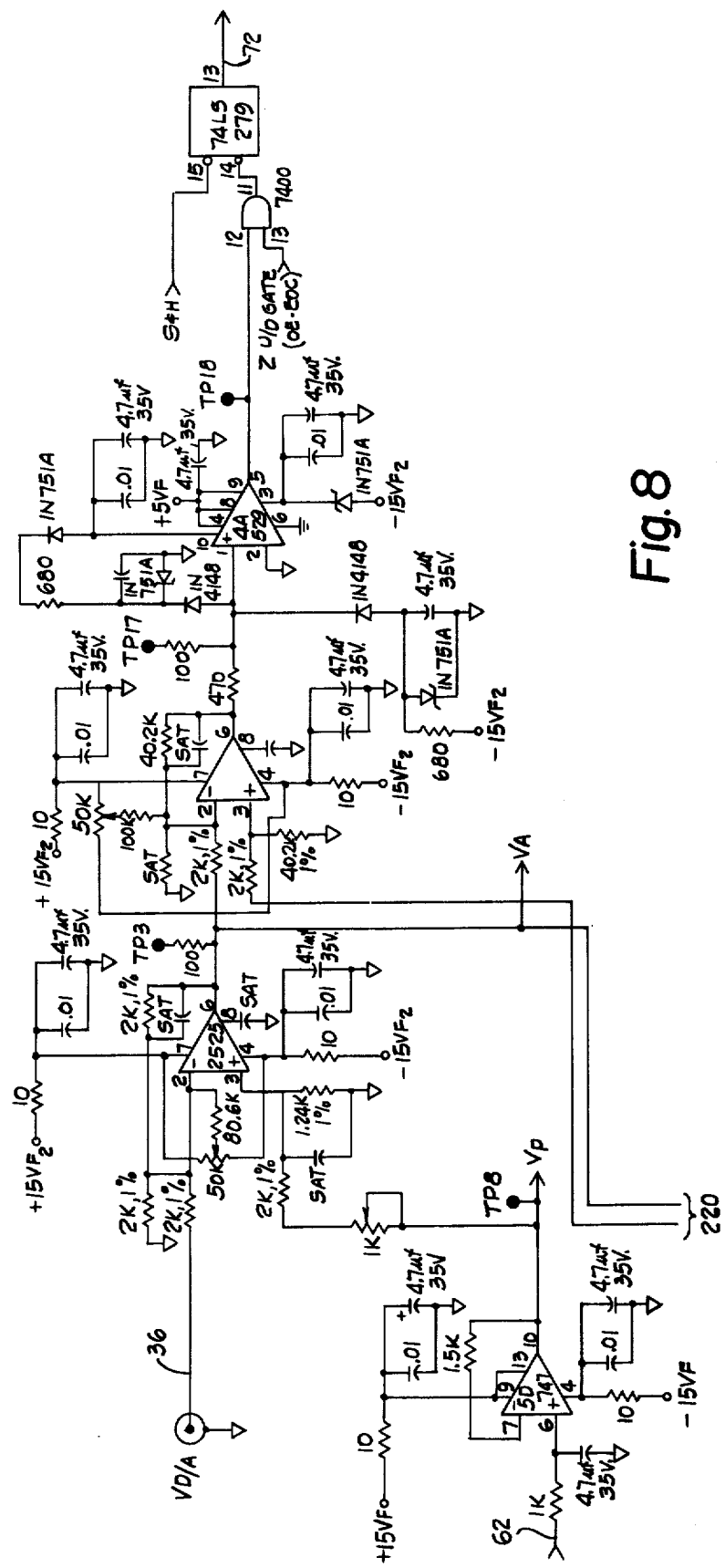
Figure 9:
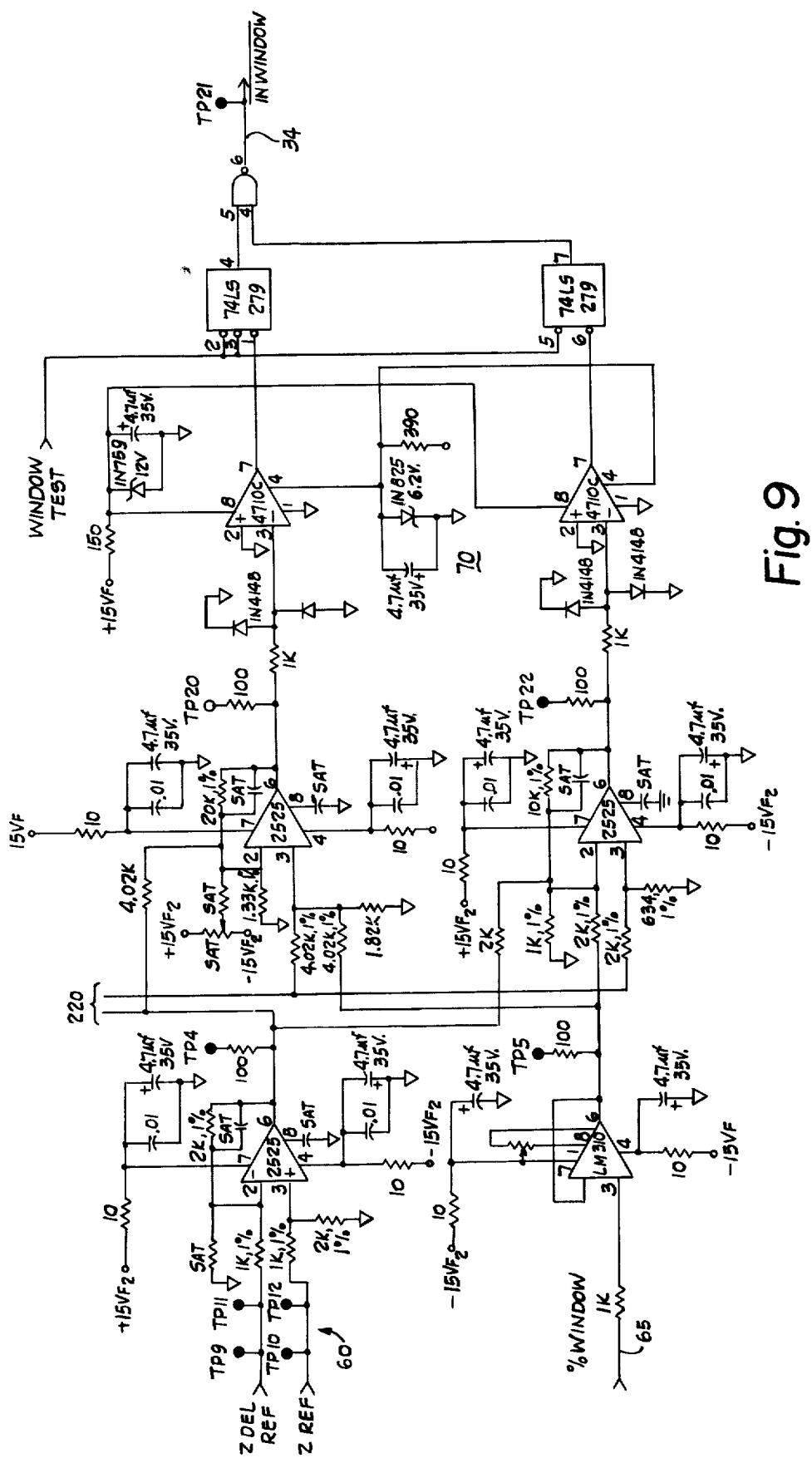

The pulse-height analyzer circuitry 28 is illustrated in schematic form in FIGS. 7 through 9. The pulse-height analyzer 28 includes summing amplifiers which combine the "Z" signal from the delay sample and hold circuitry 21, appearing on a set of leads 60, with (1) the regional correction voltage from the window correction processing circuitry 30, appearing on the lead 36, (2) the peak voltage from a peak adjustment potentiometer, appearing at a lead 62, (FIG. 8) and (3) a signal on the lead 65 for controlling the upper and lower level energy window voltages.

When this combination of signals is completed, the "Z" signal pulse level will be at 0 volts for the upper and lower limits of the energy window, and can be detected by comparators 70 for zero crossing. Depending upon the simultaneous state of the comparators 70 at the time of evaluation whether a "Z" signal falls within the defined window, a decision whether the event is within the acceptable defined energy window range is made and appears upon the lead 34. In an analogous fashion, a decision is made whether the pulse is above or below the center of the defined window. This signal appears upon a lead 72 and is used, in a manner described in more detail below, to progressively update information stored in the window correction memory 32 indicating a regional profile of the pulse-height distribution centers for the camera field.

Figure 3:
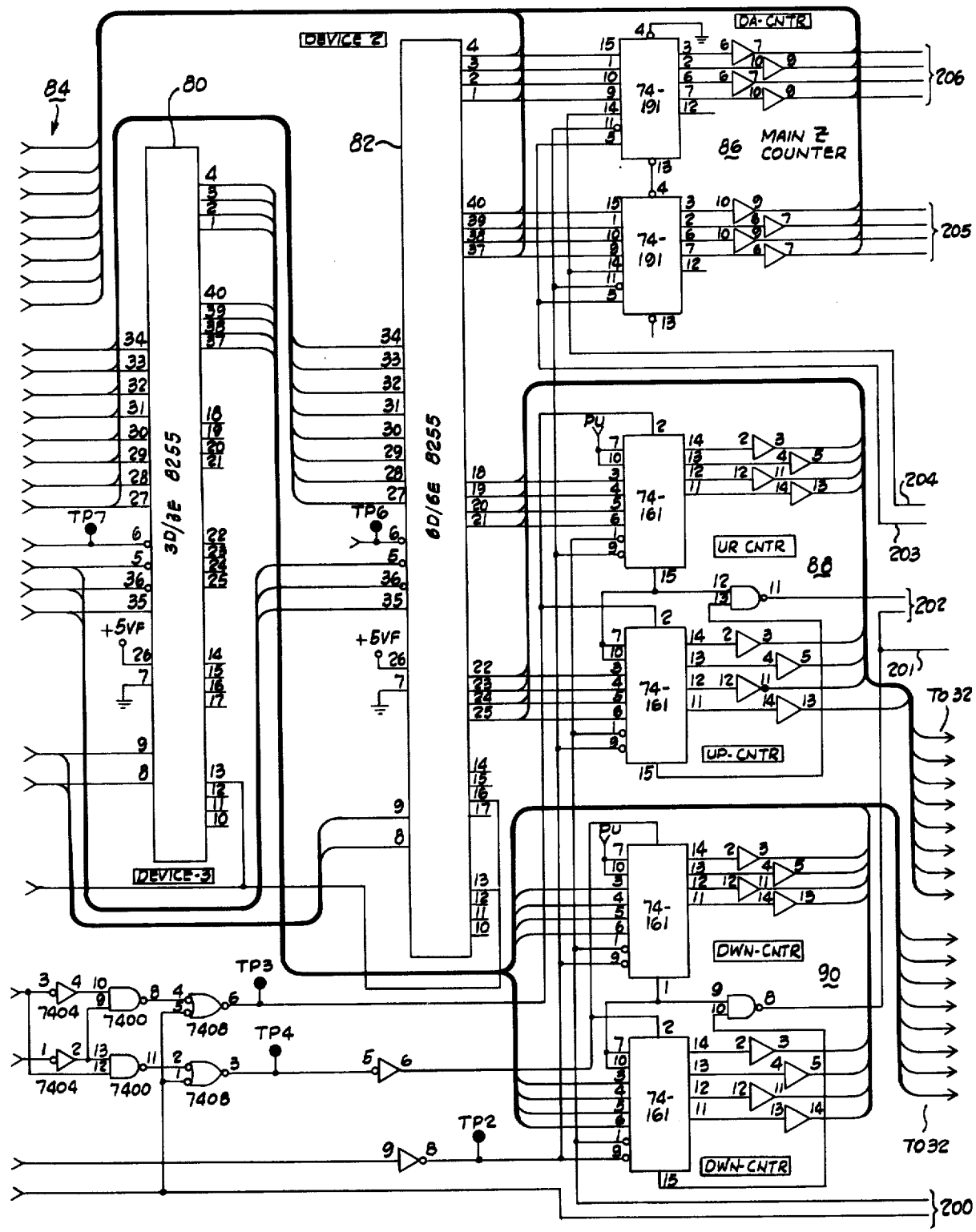
FIGS. 3–9 are schematic drawings of portions of the systems shown in FIG. 2.
Figure 4:
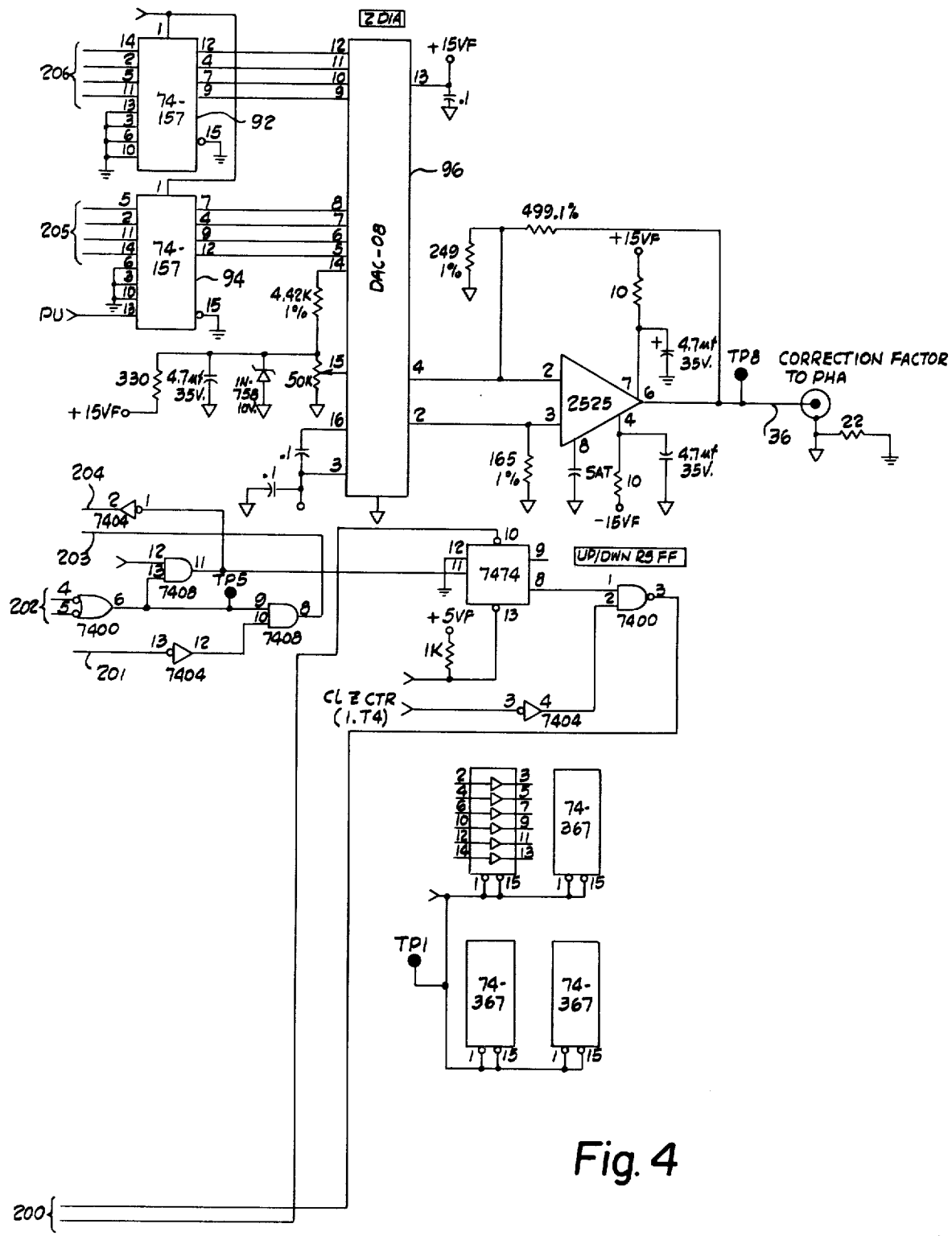

The window correction processing circuitry 30 is illustrated in schematic form in FIGS. 3 and 4. The circuitry 30 includes a microprocessor controllable port to control the flow of information from the window correction memory 32 to the calculation circuitry 44. Integrated circuits 80, 82 comprise the ports. The circuitry 30 is fed by a twenty-four bit bus, generally indicated at 84, from the window correction memory 32. Three counters, 86, 88, 90 are used for processing the information from the memory 32. These three counters are each made up of two four-bit counters each, and can be separated into a down counter 90, an up counter 88, and a main counter 86. During the accumulation mode, the memory contents, for a channel for a particular address indicated by the radiation count signal being processed, is loaded into these three counters. The up counter 88 increments its corresponding stored value each time a radiation count bears an energy level value above the center of the window defined by the pulse-height analyzer 28. The down counter 90 increments its corresponding stored value each time an event is below the center of that window. The main counter stores a value for the channel indicating the peak of the pulse-height distribution of the region corresponding to the channel until one of the counters 88, 90 reaches a predetermined number.

The difference between the values stored in the counters 88, 90 indicates in which direction the distribution peak indicating signal stored in the main counter 86 must be corrected to cause its value to more closely approximate the statistical peak of the pulse-height distribution for the field region corresponding to the channel address presently being examined and processed by the counters 86, 88, 90. After this correction is made, the up and down counters 88, 90 are restored to zero counts, the data in the three counters is returned to its memory channel, and the iterative process for this channel is repeated whenever the next pulse having a location putting it within that channel's region occurs.

During the on-line mode of operation, contents of the respective channels of the memory 32 are loaded in the same way into the counters of the processing circuitry 30, in accordance with the field regions of detected counts. In this mode, only the stored value corresponding to the main counter 86 are used, and that information is passed through selected integrated circuits 92, 94 to a digital to analogue converter 96. The digital to analogue converter 96 forms an analogue correction factor for controlling the pulse-height analyzer circuitry 28 to position the window appropriately for the field region of the count being processed. This signal appears at the lead 36.

The selector circuits 92, 94 also provide for injection of zero correction factors to the pulse-height analyzer for test purposes.

Figure 5:
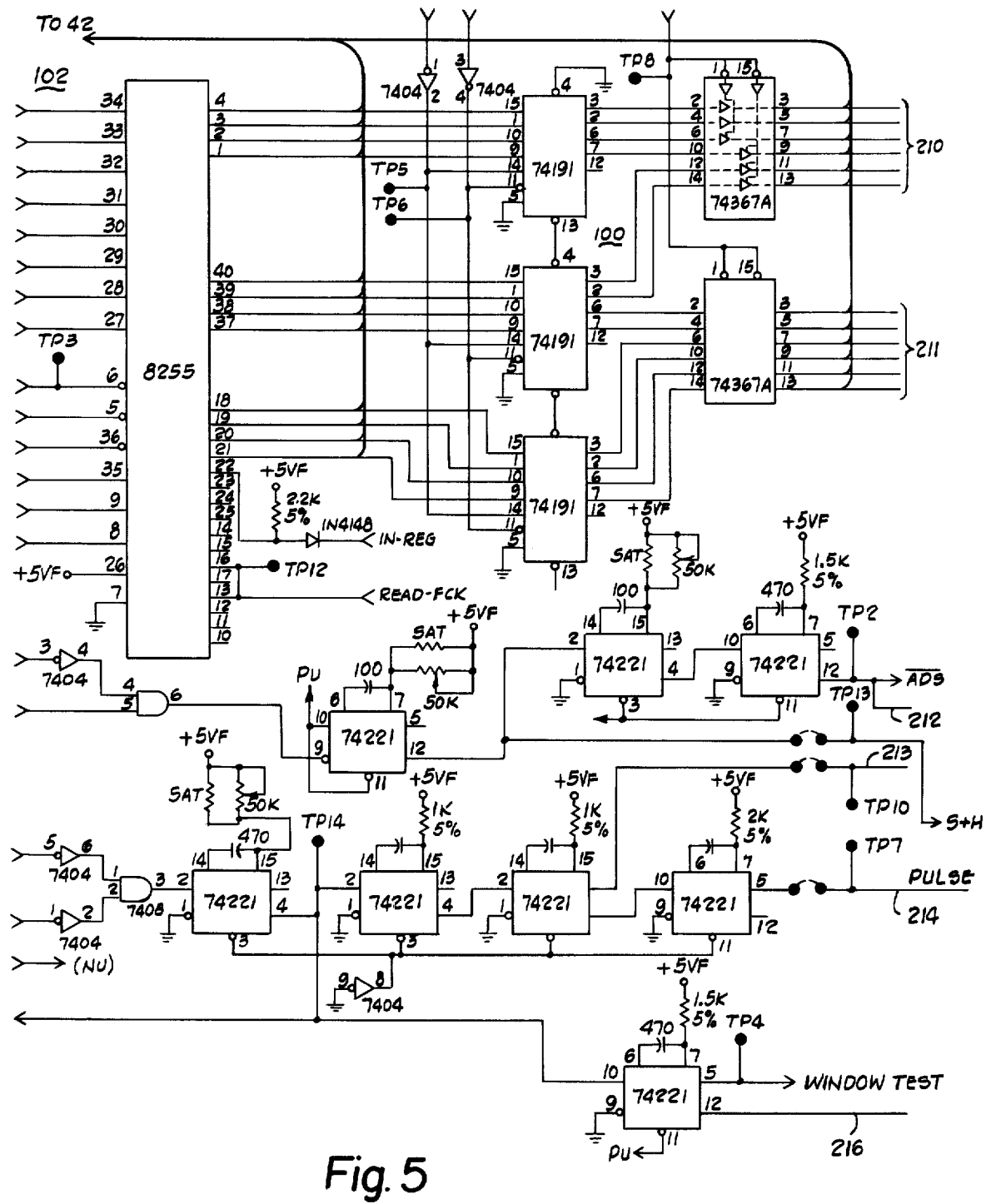
Figure 6:
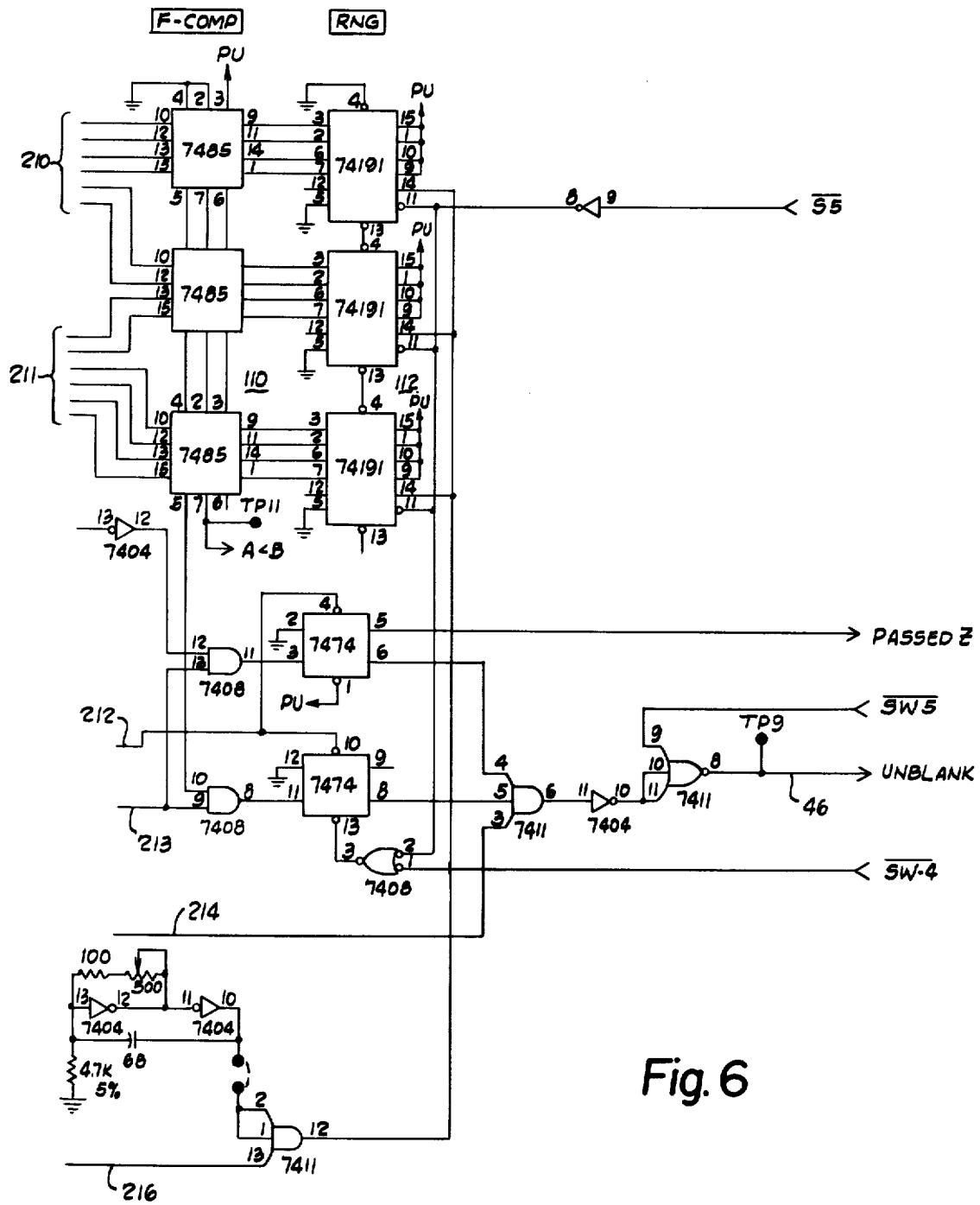

The flood correction processing circuitry 40 is illustrated in schematic form in FIGS. 5 and 6. The flood processing circuitry 40 includes a microprocessor controllable port to control the flow of information from the flood correction memory 42 to the calculation circuitry 44. A twelve-bit accumulator 100 which can be loaded from the flood correction memory 42 comprises three four-bit counters. The accumulator 100 is used during the accumulation mode, to increment each flood memory location, as needed, up to 4 K counts maximum. This accumulator is buffered by the use of twelve-bit bus drivers.

During the calculation mode, the memory channel contents are sent directly to the calculation circuitry 44 and back, by way of a set of leads 102, and a set of leads 104, directed to the memory 42. The circuitry 44 takes the stored numbers of counts, calculates correction factors for each, and replaces the stored count numbers with the respectively calculated correction factors in the memory 42.

During the on-line operation mode, the appropriate newly generated and stored correction factors from the memory 42 are retrieved, in response to the radiation count signals, for the respective addresses corresponding to the regions in which the counts take place. The retrieved correction factor is compared by a comparator 110 with the output of a continuously running counter 112 to determine whether the event should be unblanked, so that it can be processed by the display apparatus of the radiation scintillation camera.

Because of the random addresses of consecutive radiation events and their corresponding count signals, for large numbers of counts the twelve-bit counter 112 can be regarded as at a random number within its range at any given moment for any given event. If, for example, it is desired to decrease sensitivity for a particular region, as indicated by a channel address of the memory, by twenty percent, the correction factor stored in the memory for that address will be a number twenty percent from the top value of the range of the counter. The correction factor number and the counter number are then compared at the moment the radiation count signal is processed. If the correction factor number is greater than the number at which the counter is counting at that moment, the radiation camera display will be unblanked to display that radiation count. If it is less, unblanking will occur. Thus, over a large number of counts, twenty percent of the counts from that region corresponding to the channel under consideration will be discarded, since the probability of the counter being at a higher value than a number twenty percent from its highest value, is twenty percent.

The flood correction memory and window correction memory circuitry are made of similar components. The flood correction memory consists of a 4 K by 16 bit random access memory. Only 12 bits are used for the storage data. The window correction memory comprises two such 4 K by 16 bit random access memories.

The calculation circuitry 44 comprises a processing unit centered around an 8080 type in microprocessor with a random access memory for data storage while processing, and a read only memory for program storage, as well as clocks and buffers as appropriate. The calculation circuitry, and the precise arithmetical mode of calculating correction factors, can be easily selected by one of ordinary skill, given the forgoing parameters and functional requirements of the uniformity correction system U.

One suitable arithmetic method of computing the regional correction factors comprises the following steps:

(1) scanning the contents of the flood correction memory 42 and determining the lowest count among its address channels;

(2) dividing the lowest count by the number of counts contained in each of the address channels, and (3) multiplying each of these quotients by the maximum integer selected for the operation of the counter 112.

The timing circuitry 52 can likewise be selected from known hard wire components. Nonetheless, for the benefit of those not skilled in this area of technology, reference may be had for suitable embodiment of these components to the above referenced "Micro Z" system, and literature descriptive thereof.

It is believed that a detailed description of the four operation modes of the system U is of assistance in understanding the structure of the system circuitry. During the accumulation mode, the address of the flood correction memory 42 are initialized to zero. The addresses of the window correctionmemory 32 (the portions which are sent to the main counter 86) are each loaded with a number value which is half the total range of the "Z" pulse-height distribution peak value which can be stored in each memory channel. The up and down counters 88, 90 are each initialized to zero.

In the accumulation mode, the camera field is flooded with a substantially uniform source of radiation. During this mode, the co-ordinate X-Y signals of the counts generated from the uniform radiation source are used to simultaneously address the flood and window correction memories 42, 32. Each "Z" signal is initially roughly pulse-height analyzed in previously known circuitry of the "Dyna Camera 4" to about a 45% window to pre-screen each radiation count signal. Each "Z" pulse is also analyzed to determine whether its energy is in the top half of the pulse-height analyzer 28 window, or in the lower half. If the count is in the lower half the down counter 90 of the processing circuitry 40 is incremented. If the count is in the upper half, the up counter 88 is incremented.

It is important to note that, since the locations of any sequence of events are randomly ordered, it is not possible to process a number of events in the same region in consecutive sequence. Rather, each time an event occurs in a particular region, the processing circuitry 32 retrieves the memory contents for that channel, increments the up or down counter by 1, and then returns the incremented contents of the counters to the memory channel, and proceeds to perform a similar process for the next count signal, which likely corresponds to a different address.

After processing a sufficient number of events, one of the up or down counters will reach a predetermined value for each address channel. When such a number is reached for a specific address, a decision is made by analyzing the contents of the up and down counters. If the up counter contains a higher number than the down counter, indicating that a higher number of events have occurred in the upper half of the window for that channel than for the lower half, the main memory counter 86 for that channel will be incremented. Where the down counter contains a higher number, the main counter is decremented.

When a sufficient number of counts have been processed, the stored value in each channel, corresponding to the main counter 86, will contain a number, which may be higher or lower than the midrange at which it was initialized, which will indicate the value of the peak of the energy level statistical distribution curve for the region to which the address channel corresponds.

After this Z window correction accumulation phase is complete, the window processing circuitry, as described in more detail elsewhere, begins operation in an on-line mode, and the system begins a flood accumulation phase of the accumulation mode.

During the flood accumulation mode, the flood memory 42 addresses are incremented one count per event per address.

The combined window and flood phases of the accumulation mode is performed over a length of time suitable for accumulating approximately 80 million radiation counts, which requires approximately on hour.

During the calculation mode, the data from the flood correction memory 42 is extracted for each address and the address with minimum count containment is located. The values in the other addresses are compared with this minimum value, and a correction factor is calculated for each channel to provide for discarding of a fraction of events to take place in the on-line mode in order to equalize the response in each channel to uniform radiation.

During on-line operation, the X-Y signals of the radiation counts are used to address both memories 42, 32. The window correction memory correction factor for a channel corresponding to the region of the count being processed is added to the setting of the pulse-height analyzer 28 window to regionally adjust it up or down as required for each processed count. The pulse-height analyzer 28 decides whether to display or discard each count (contingent also upon the blank or unblank decision made by the flood correction processor 40 in response to the same count).

Simultaneously, the flood correction memory correction factor is compared to the instantaneous count on the counter 112. This decision, explained in more detail above, plus the pulse-height analyzer window decision, combine to decide whether to display a representation of the count, or whether to discard it.

This detailed description is intended as illustrative, rather than exhaustive, of this invention. It is to be understood that one of ordinary skill may make certain additions, deletions or modifications to the specific embodiment disclosed here, without departing from the spirit or scope of this invention, as set forth in the appended claims.

What is claimed is:

1. A method of correcting for nonuniformity in imaging of a scintillation camera, the camera having means for producing, in response to radiation events, radiation count signals indicating the location and energy level of associated radiation events, and means for defining an energy range for discarding counts representing events having an intensity outside the defined energy range, and means for producing a display representing radiation events in response to undiscarded radiation counts, said method comprising the steps of:

(a) adjusting in real time the range defining means for adjusting the defined energy range relative to the energy level indications in response to the occurrance of each count as a function of the location of the count, and (b) adjusting the response of the camera as a function of location to uniform radiation within its field of view to compensate for regional variations in the sensitivity of the camera within the field.

2. The method of claim 1, wherein the regional response adjusting step comprises:

(a) defining a set of indications of camera sensitivity, each member of the set defining sensitivity in a different predetermined region of the field;

(b) utilizing the regional sensitivity information for calculating a correction factor associated with each of the regions, and (c) utilizing the correction factor for each region for regionally adjusting the camera's response to radiation counts as a function of their indicated coordinate location.

3. The method of claim 2, wherein the step of defining the regional sensitivity indications comprises:

(a) flooding the camera field of view with substantially uniform radiation, and (b) accumulating over a time in a multichannel memory a profile defining the number of radiation counts occurring in each of the regions.

4. The method of claim 2, wherein said correction factor calculation step comprises:

(a) scanning the contents of the multichannel memory and locating the region-indicating channel having the lowest accumulated count, and (b) calculating the correction factors for the respective other regions relative to said lowest count.

5. The method of claim 2, wherein the step of utilizing the correction factors comprises:

(a) continuously operating a counter, and (b) comparing the counter output and the correction factors for the respective regions to discard a predetermined ratio of counts corresponding to each region as a function of the correction factor values.

6. The method of claim 1, wherein said step of energy range adjustment comprises:

(a) producing a profile of stored information describing energy distribution response of the radiation camera in each of a plurality of regions within the field of view, and (b) utilizing the energy distribution response information in the regional profile for adjusting the energy range defining means for each of a series of counts to substantially and successively align the energy range to which the camera is responsive with the energy distribution characteristic of the particular region corresponding to each respective radiation count.

7. A system for correcting for nonuniformity in imaging by a scintillation camera, the camera having means for producing, in response to radiation events, radiation count signals each indicating the location and energy level of an associated radiation event, and means for defining an energy range for discarding counts representing events having an energy level outside the defined energy range, and means for producing a display representing radiation events in response to undiscarded radiation counts, said system comprising:

(a) energy window correction circuitry for adjusting the energy range defining means, in real time for each of a succession of counts, for each respective count as a function of the location indicated by the count, and (b) flood correction circuitry for adjusting the regional response of the camera within its field of view to compensate for regional variations in the sensitivity of the camera within the field.

8. The system of claim 7, wherein the flood correction circuitry comprises:

(a) a multichannel flood correction memory for defining an indication of camera sensitivity in each channel, each channel defining the camera sensitivity in a different predetermined region of the field, and (b) flood processor circuitry for utilizing the regional sensitivity information stored in the flood correction memory for calculating a sensitivity correction factor associated with each of the defined regions and for utilizing the correction factor for each region for regionally adjusting the camera's response to radiation counts as a function of their respectively indicated co-ordinate locations.

9. The system of claim 8, wherein said flood correction processor comprises:

(a) circuitry for accumulating sensitivity information in the flood correction memory and locating the region-indicating channel having the lowest accumulated count, and (c) circuitry for calculating the correction factors for the respective other regions relative to said lowest count.

10. The system of claim 8, wherein said flood processor comprises:

(a) a continuously operable counter, and (b) comparison circuitry responsive to the counter and the correction factors for the respective regions to discard a predetermined ratio of counts for each region as a function of the correction factor for that region.

11. The system of claim 7, wherein said energy window adjustment circuitry comprises:

(a) a multi-channel window correction memory for storing a profile of information describing energy distribution response characteristics of the radiation camera in each of a plurality of regions within its field, and (b) an energy window processor for utilizing the energy distribution response information stored in the window correction memory for adjusting the energy range defining means for each of a succession of radiation counts to substantially align the energy range to which the camera is responsive with the energy distribution characteristic of the region corresponding to each respective radiation count.

12. The system of claim 11, further comprising:

(a) circuitry for initializing each channel of the window correction memory to a predetermined value;

(b) an up counter and a down counter;

(c) means for comparing the energy levels of each incoming radiation count with the window defined by the range defining means and for operating in conjunction with the up and down counters for adjusting the corresponding energy level values stored in the window correction memory as a function of the energy levels of the counts.

13. A sensitivity enhancement system including circuitry for use with a radiation camera which is responsive to radiation events within a field of view to produce radiation count signals indicating the location and intensity of the radiation events and having means for displaying a representation of the radiation events in response to the radiation counts, said camera having pulse height analysis circuitry for limiting the display response of the camera to radiation events having an intensity generally falling within a predetermined energy range, said sensitivity enhancement circuitry comprising:
- (a) means for accumulating a stored information profile representing regional characteristics of the response of the camera to radiation events with respect to energy level of the radiation events within each of a plurality of different regions within the camera's field, and
- (b) circuitry for operating in real time in response to each of a succession of individual radiation counts to adjust the predetermined energy range of camera response relative to the energy distribution response characteristic of the camera corresponding to the region associated with each of the succession of said respective counts.

14. A system for correcting count sensitivity per unit area and enhancing resolution of a scintillation camera, the camera having means for detecting nuclear events in a field and producing in response thereto count signals indicating energy and coordinates location of nuclear events detected by the camera and means for producing a display representing a pattern of detected nuclear events, said system comprising:
- (a) a pulse height analyzer defining an energy window having an adjustable energy center for limiting the radiation counts processed by the camera display to those counts corresponding to energy within the defined window;
- (b) intensity correction circuitry for regionally aligning, in substantially real time and for each count, the energy window center defined by the pulse height analyzer in accordance with regional energy response characteristics of the camera within the field, and
- (c) flood correction circuitry for controlling the ratio of radiation counts in each of a set of coordinate regions which are displayed by the camera as a function of regional sensitivity of the camera within its field.

15. A uniformity correction system for use with a scintillation camera having means for detecting radiation events in a field and producing radiation counts including information defining the intensity and location of radiation events in response to which the counts are produced, and means responsive to counts to display a pattern representing radiation event distribution, the system comprising:
- (a) a pulse height analyzer for transmitting for display only counts representing an energy level within an adjustable range;
- (b) an intensity correction memory for separately storing indications of radiation count energy related response in each of several regions of the camera field;
- (c) intensity correction processor circuitry responsive to information stored in the intensity correction memory and to the regional location of an individual radiation count to relatively change in real time the pulse height analyzer range to generally coincide with the energy distribution response of the region of the count;
- (d) a flood correction memory for storing information describing the sensitivity of the camera to uniform radiation in separate regions within the field;
- (e) calculation circuitry for scanning the information stored in the flood correction memory and for developing sensitivity correction factors corresponding to regions defined in the flood correction memory;
- (f) a flood correction processor responsive to the calculation circuitry and to the indicated regions of radiation counts to apply the correction factors to counts according to their indicated region to adjust the ratios of counts from each of said regions which are displayed by the scintillation camera in accordance with the regional sensitivity of the camera within its field.

16. A system for enhancing the uniformity of response and resolution of a scintillation camera, the camera having means for producing radiation count signals describing the location and intensity of radiation events within a field of view, and for producing a display describing a pattern of the radiation events in response to the radiation count signals, said system comprising:
- (a) a window correction memory for accumulating a regional profile describing the response of the camera as a function of energy variation of radiation events within each of a plurality of regions within the camera's field of view;
- (b) an energy window correction processor responsive to the energy distribution profile information to adjust in real time the energy related response of the camera to each of a succession of radiation counts as a function of count location;
- (c) a flood correction memory for accumulating a regional profile of the degree of camera sensitivity to uniform radiation within each of a plurality of regions within the field of view, and
- (d) flood correction processing and calculation circuitry for utilizing the stored sensitivity profile information for discarding a predetermined ratio of radiation count signals corresponding to each defined region as a function of the sensitivity of the camera in that region to compensate for nonuniformity in sensitivity among the various regions.

17. A system for a scintillation camera having decoding means for producing radiation count signals representing location and energy of radiation events in a subject field, said system comprising:
- (a) a first stage including circuitry for compensating in real time for radiation energy decoding errors manifested in the energy representation of counts, and
- (b) a second stage including circuitry for compensating for location decoding errors manifested in count representations.

18. The system of claim 17, wherein the first stage comprises:
- (a) means for locating the peak of the energy pulse height distribution curve for each of a plurality of field regions;
- (b) circuitry for defining a pulse height distribution window of the camera for controlling the energy range of counts accepted for processing by the camera, and
- (c) circuitry for calculating correction factors for each of the field regions for successively aligning the pulse height window with the peaks of the pulse height distributions of respective regions corresponding to a succession of radiation counts.

19. A radiation camera system comprising:
(a) a detector unit having decoding means for producing radiation count signals representing the two dimensional location within a field and the energy level of radiation events emanating from a subject and impinging upon the detector unit;
(b) imaging electronics for processing the radiation count signals;
(c) display apparatus responsive to the processed radiation count signals for producing a visual representation of a pattern of radiation events emanating from the subject, and
(d) a uniformity enhancement system comprising:
  (i) a first stage including circuitry for compensating in real time for radiation energy decoding errors manifested in the energy representation of radiation counts, and
  (ii) a second stage including circuitry for compensating for location decoding errors manifested in the radiation count signals.

20. A radiation camera system comprising:
(a) a detector unit having decoding means for producing radiation count signals representing the two dimensional location within a field and the energy level of radiation events emanating from a subject and impinging upon the detector unit;
(b) imaging electronics for processing the radiation count signal;
(c) display apparatus responsive to the processed radiation count signals for producing a visual representation of a pattern of radiation events emanating from the subject, and
(d) a uniformity correction enhancement system comprising;
  (i) a first stage including circuitry for compensating in real time for radiation energy decoding errors manifested in the energy representation of radiation counts, and
  (ii) a second stage including circuitry for correcting regional image sensitivity errors manifested in the radiation count signals.

21. A method of correcting for nonuniformity in imaging of a scintillation camera, the camera having means for producing, in response to radiation events, radiation count signals indicating the coordinate location and energy level of associated radiation events, and means for defining an energy window range for discarding counts representing events having an energy intensity outside the defined energy window range, and means for producing a display representing radiation events in response to undiscarded radiation counts, said method comprising the steps of:
(a) adjusting the range defining means for adjusting the defined energy range in response to the occurrence of radiation counts as a function of the respective locations represented by the counts, and
(b) adjusting the response of the camera to radiation as a function of location within its field of view to compensate for undesirable nonuniformity in regional image count density of the camera.

22. A method of correcting for nonuniformity in imaging by a scintillation camera, the camera having means for producing, in response to radiation events, radiation count signals indicating coordinate location and energy level of such radiation events, and means for defining an energy window range for discarding radiation count signals representing radiation events having an energy level outside the defined energy window range, and means for producing a display representing radiation events in response to undiscarded radiation events, said method comprising the steps of:
(a) electronically adjusting the range defining means for adjusting the defined energy window range in response to the occurrence of radiation counts and as a function of respective locations of radiation events represented by the counts;
(b) defining in an electronic memory a set of correction factors each defining regional image count density in a respective region of the camera's field in response to uniform radiation across the field, and
(c) utilizing the correction factors for electronically further adjusting the response of the camera to radiation as a function of the location of such radiation within the camera field of view.

23. The scintillation camera comprising:
(a) means for producing, in response to radiation events, radiation count signals indicating the coordinate location and energy level of associated radiation events;
(b) means for defining an energy window range for discarding radiation counts representing events having an energy level outside the defined energy window range;
(c) means for producing a display representing radiation events in response to undiscarded radiation counts;
(d) electronic circuitry for adjusting the range defining means for adjusting the defined energy range in response to the occurrence of radiation counts, said adjustment being performed as a function of the respective locations of radiation events represented by the radiation counts;
(e) electronic circuitry for producing and storing in a memory a set of correction factors each representing a characteristic of camera sensitivity in a respective predetermined region of the camera's field, and
(f) electronic circuitry responsive to the correction factors for further adjusting the response of the camera to radiation counts as a function of location within the camera field of the events as represented by the respective counts.

* * * * *